United States Patent [19]

Ensign

[11] Patent Number: 4,865,078
[45] Date of Patent: Sep. 12, 1989

[54] MANUAL CONTROL VALVE

[75] Inventor: Harold W. Ensign, Fullerton, Calif.

[73] Assignee: Cla-Val Co., Newport Beach, Calif.

[21] Appl. No.: 317,815

[22] Filed: Mar. 1, 1989

[51] Int. Cl.[4] .......................................... F16K 31/524
[52] U.S. Cl. .................................. 137/636.1; 251/90;
251/96; 251/251; 251/263
[58] Field of Search ............... 137/636, 636.1; 251/90,
251/95, 96, 285, 290, 291, 251, 252, 262, 263

[56] References Cited

U.S. PATENT DOCUMENTS

| | | | |
|---|---|---|---|
| 262,632 | 8/1882 | Whittaker | 137/636 |
| 701,509 | 6/1902 | Rylands | 137/636.1 |
| 766,116 | 7/1904 | Rawl et al. | 137/636.1 |
| 925,257 | 6/1909 | Winkler | 251/96 |
| 1,078,939 | 11/1913 | Miller et al. | 137/636.1 |
| 1,089,098 | 3/1914 | Winkler | 251/96 |
| 1,203,321 | 10/1916 | Fosdick | 137/636.1 |
| 1,597,101 | 8/1926 | Mueller | 137/636.1 |
| 1,759,433 | 5/1930 | Carmosin | 251/96 |
| 2,504,610 | 4/1950 | Wolf | 277/18 |
| 2,959,188 | 11/1960 | Kepner | 137/540 |
| 2,994,340 | 8/1961 | Biello et al. | 137/516.29 |
| 3,998,241 | 12/1976 | Jones et al. | 137/454.6 |
| 4,007,757 | 2/1977 | Emmert | 137/315 |

OTHER PUBLICATIONS

Cla-Val Co. of Newport Beach, Ca. -A Manual and Pivotable Valve Handle Operator-Cla-Val with Selector Means.

Primary Examiner—George L. Walton
Attorney, Agent, or Firm—Gausewitz, Carr & Rothenberg

[57] ABSTRACT

A manual control valve for a remotely operated munitions magazine sprinkler valve employs a compact body, a pressure input port and first and second output ports to which are secured tubular seat housings, each carrying a valve seat. First and second poppets are slidably mounted in the tubular seat housings and are spring urged to closed position. One or the other of the poppets is pulled open by means of a handle operated rotary cam, which allows both poppets to be closed by spring and water pressure. A modified valve configuration provides a three-way valve.

23 Claims, 6 Drawing Sheets

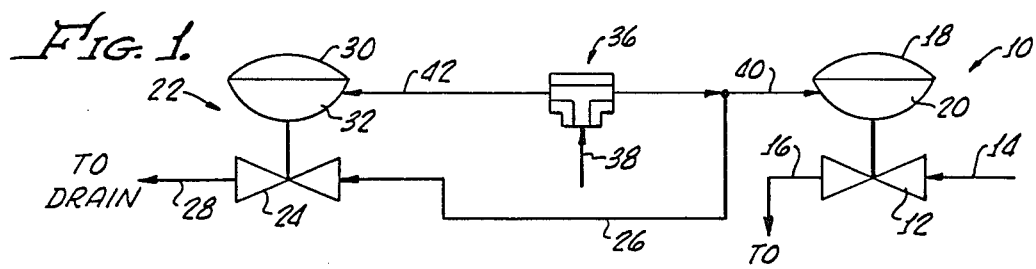
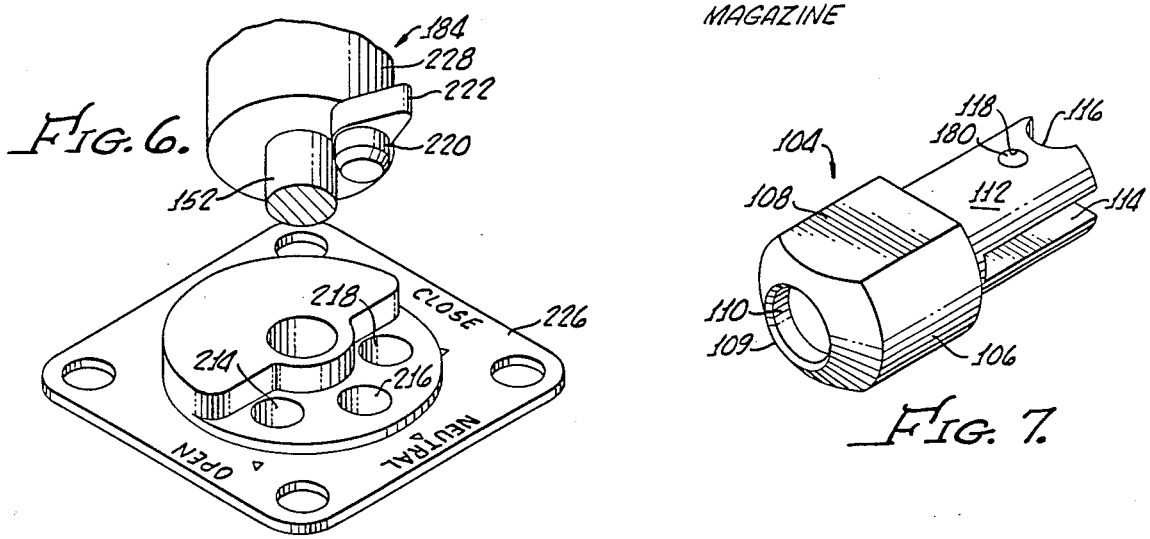
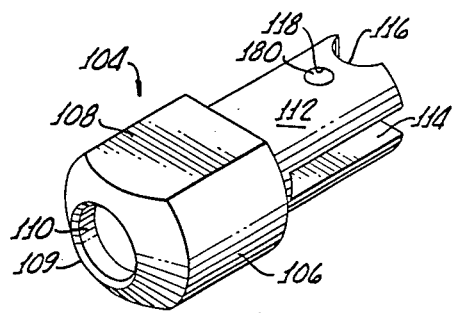
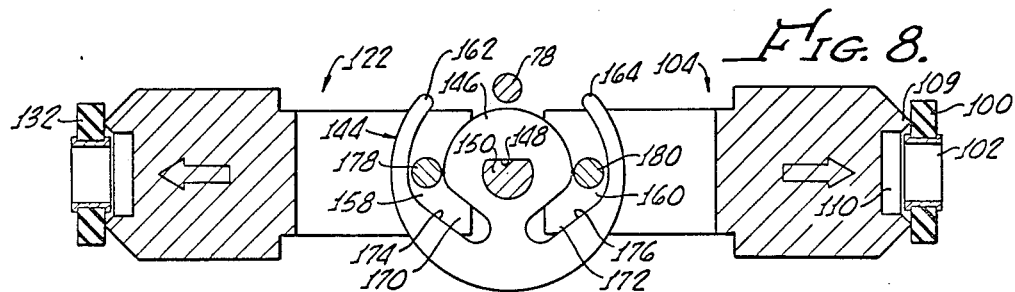
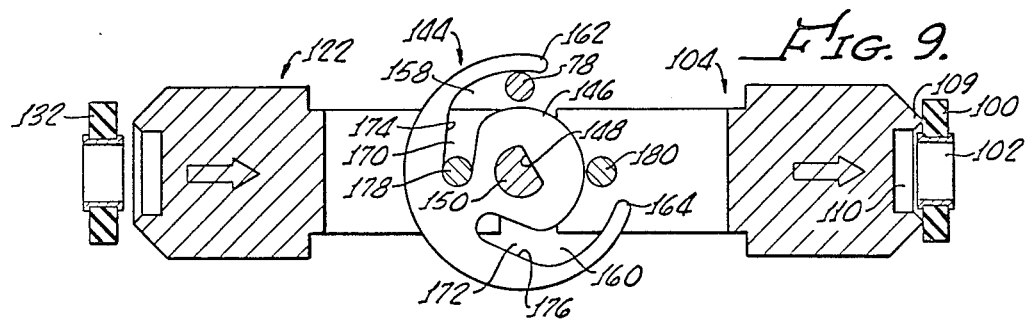
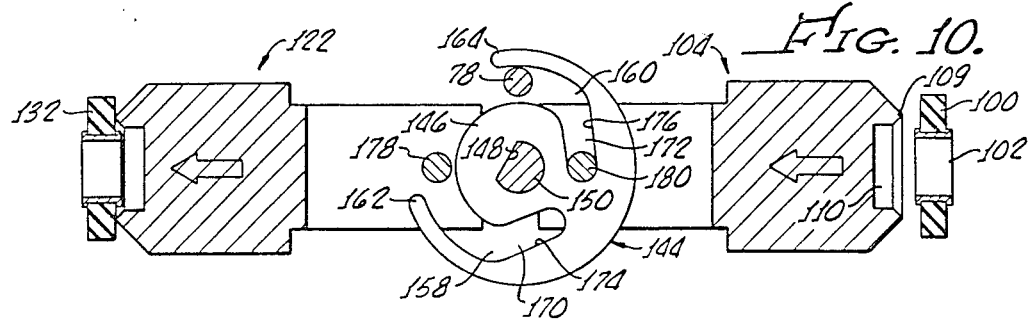

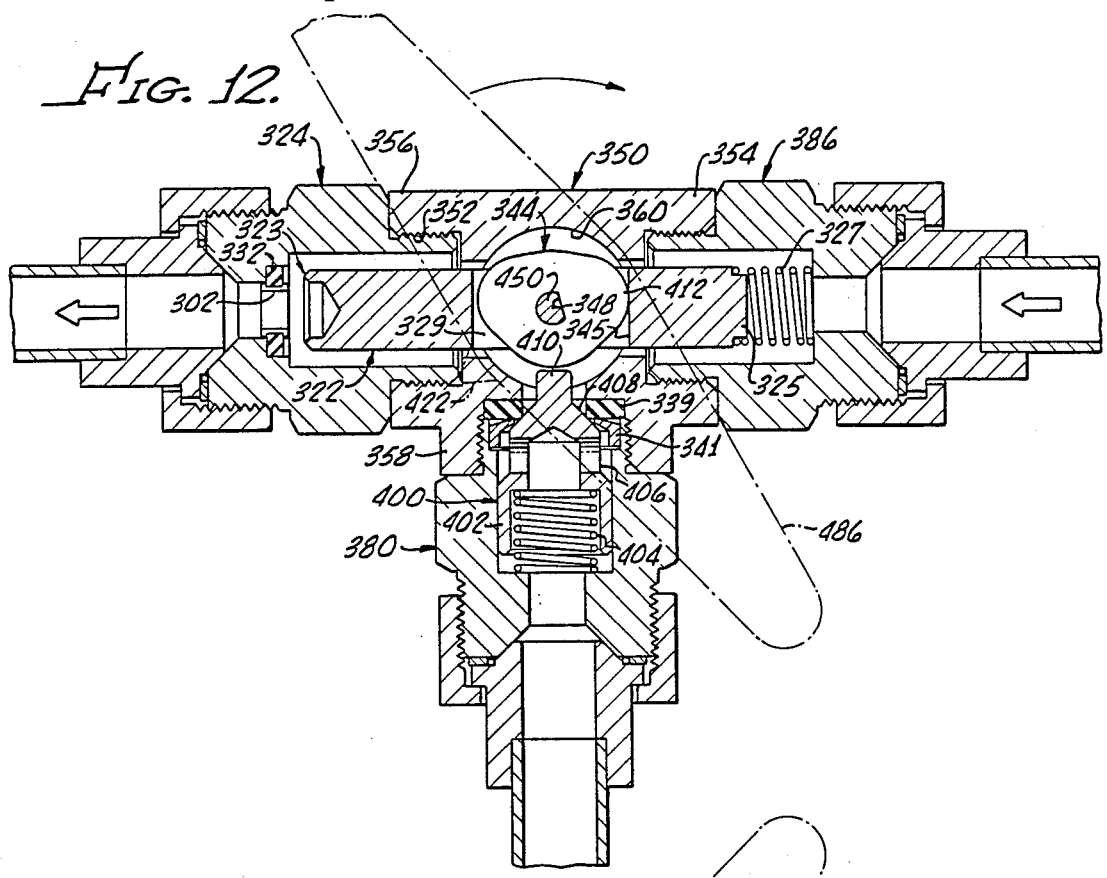
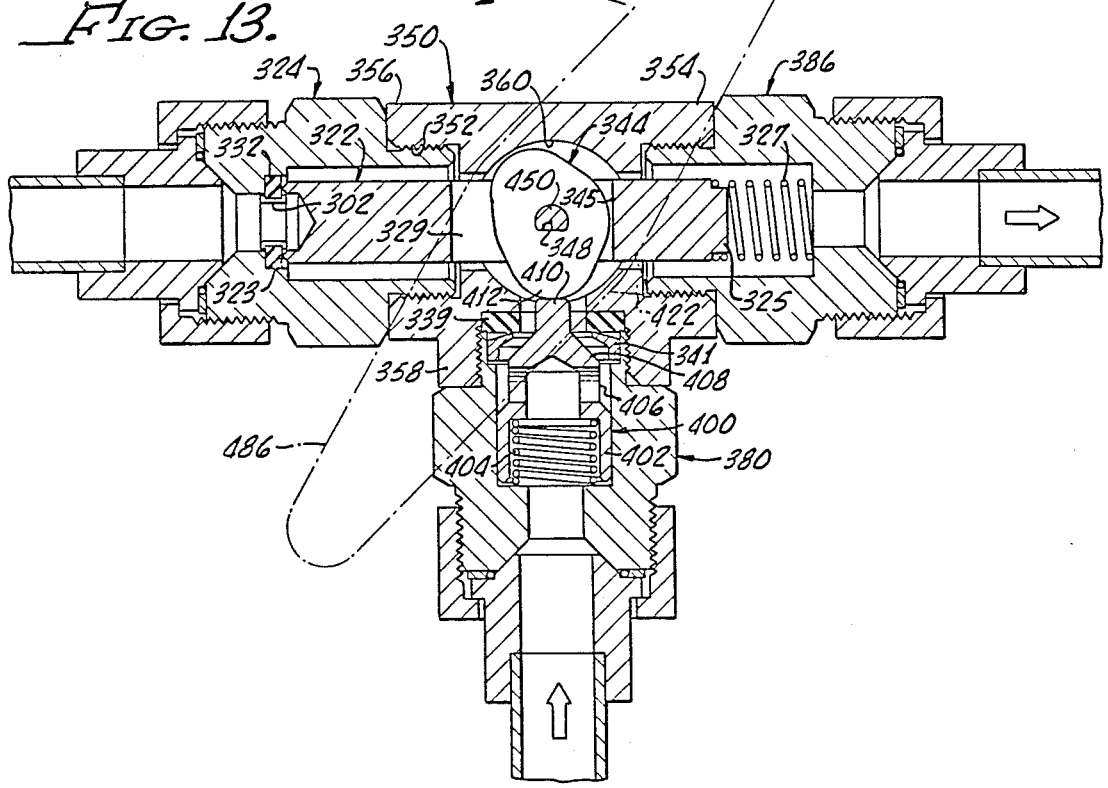

MANUAL CONTROL VALVE

BACKGROUND OF THE INVENTION

The present invention relates to manual control valves, and more particularly concerns such a valve in which liquid under pressure from an input port can be directed through one or the other of its ouput ports, or blocked completely.

Shipboard munitions magazines are commonly provided with sensor controlled magazine sprinkler valves which, upon sensing heat, automatically provide high pressure water to the magazine. Although primarily operated by automatic sensors, such magazine sprinkler valves are also provided with manual control valves to shut the valve after it has been turned on and to manually open and close the valve for test purposes.

The magazine sprinkler valve commonly has a pressure operated diaphragm that controls opening and closing of the valve itself. To open the magazine sprinkler valve, water under pressure is supplied to its diaphragm operating chamber. To close the magazine sprinkler valve, pressure in its operating chamber is drained through a check valve. A manual control valve, thus, can either open the magazine valve by providing pressure to its operating chamber, or it can close the magazine valve by a procedure which includes opening a check valve for draining of the operating chamber of the magazine sprinkler valve. In the ready state of the magazine sprinkler system one type of manual control valve is in a neutral position in which neither the draining check valve nor the magazine sprinkler valve is opened by the manual valve.

A manual control valve presently in use for a magazine sprinkler valve control employs a pair of lapped plates which may move relative to one another to open or close selected ones of a plurality of liquid flow passages by sliding the lapped surface of one plate over the lapped surface of another plate. Such valves are subject to leakage over a period of time because of the constant application of very high pressure. They are expensive to make, undesirably heavy, and involve a number of difficult manufacturing problems. Accordingly, it is an object of the present invention to provide a manual valve for controlling a magazine sprinkler valve which avoids or minimizes above-mentioned problems.

SUMMARY OF THE INVENTION

In carrying out principles of the present invention in accordance with one embodiment thereof, a control valve body includes first, second and third ports with detachably secured seat housings at the first and second of the ports. Poppets are slidably mounted in the valve body and guided in each of the seat housings and urged to closed position by water under pressured admitted through the third port to cooperate with springs on the poppets and drive the poppets onto seats mounted in the seat housings. A rotary cam, driven by a handle extending into the valve body, is operable to pull one or the other of the poppets off of its seat, and thereby to open one or the other of the valve output ports. A third position of rotation of the cam allows both poppets to be closed. The valve seats comprise apertured elastomeric discs in which the apertures are reinforced by rigid inserts. In another embodiment, for use with a different magazine sprinkler valve system, the manual control valve uses almost all of the same parts, but has a different cam and poppet arrangement to push open one or the other of two of the valve poppets so as to either supply pressure to the sprinkler valve operating chamber or to allow the latter to drain.

BRIEF DESCRIPTION OF THE DRAWINGS

FIG. 1 is a simplified schematic of certain parts of one magazine sprinkler system in which the manual control valve of the present invention is adapted to be used;

FIG. 6 is an exploded pictorial view of a portion of a handle and cover plate;

FIG. 7 is a pictorial view of one of the poppets;

FIGS. 8, 9 and 10 show the relation of the cam and poppets in three different cam positions;

FIGS. 12 and 13 are sectional views showing the valve of FIG. 11 in two different positions.

DETAILED DESCRIPTION OF THE INVENTION

Figure 2:
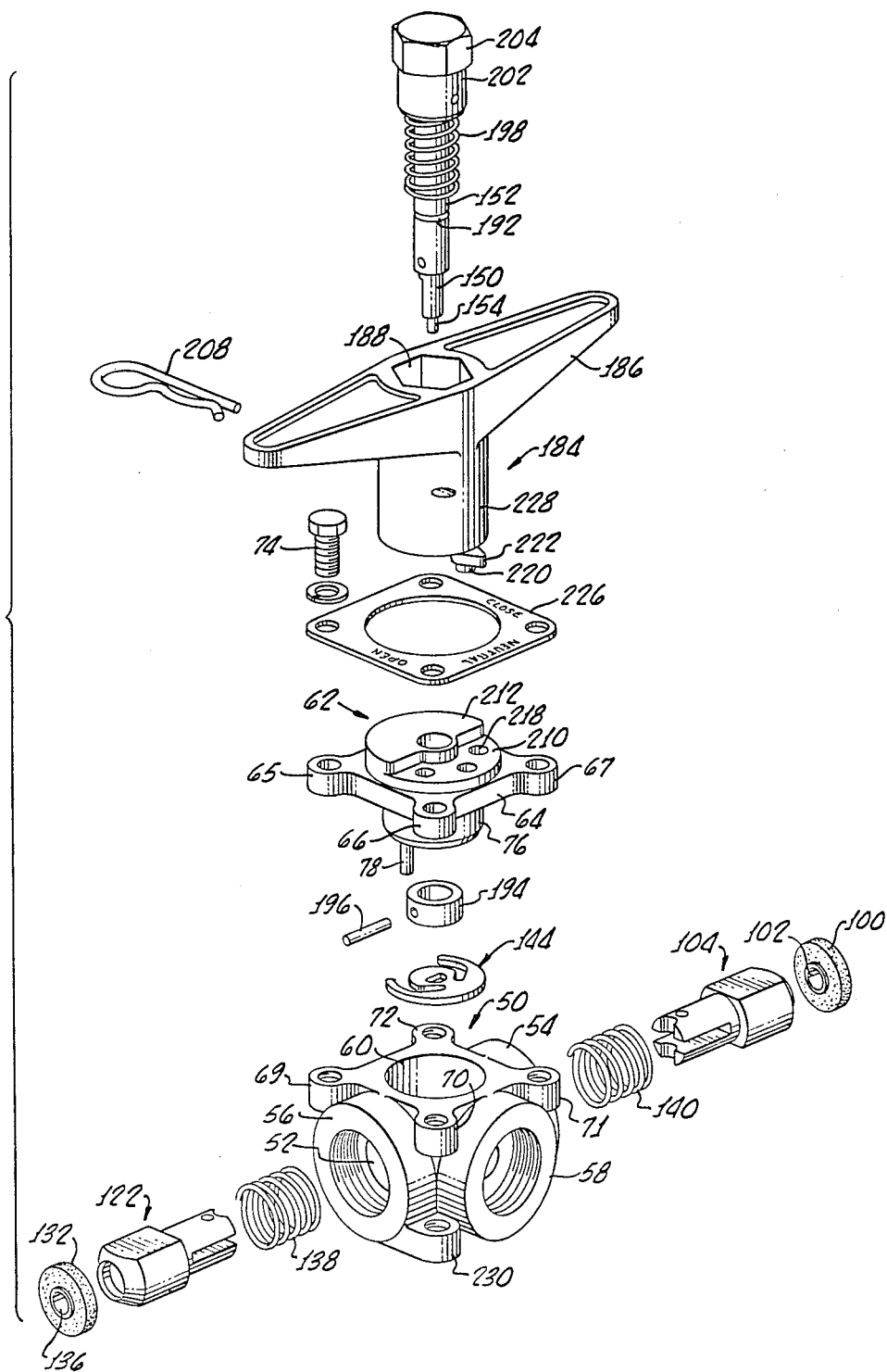
FIG. 2 is an exploded pictorial view showing major parts of the manual control valve of the present invention.

The present invention may be employed in a number of different systems in which a liquid under pressure is to be directed to one or the other, or neither, of a pair of output ports, and may also be employed as a three-way valve wherein flow may be directed to either of two of the three ports from either of two of the three ports. It has been initially embodied in control systems for a sprinkler valve of a shipboard munitions magazine, and two embodiments will be described as applied in such a system.

A first type of magazine sprinker system control is partially and schematically illustrated in FIG. 1. A magazine sprinkler valve 10, such as CLA-VAL No. 100 PM-4, made by Cla-Val Co. of Newport Beach, Calif., assignee of the present invention, includes a valve controlled passage 12 for controlling flow of fluid from a pressure input line 14 (connected to a source of water under pressure) to a pressure output line 16, which leads to one or more sprinkler heads mounted within a shipboard munitions magazine. The flow passage control 12 is operated under remote control by a valve control 18, having a power chamber 20 on the sprinkler valve. Upon application of pressurized liquid to the power chamber 20, valve passage 12 is opened to allow pressurized water to flow from supply line 14 to the sprinkler heads supplied by output line 16. When valve passage 12 is closed, pressure is removed from operating chamber 20 and is allowed to drain through a check valve 22. The check valve, which may be a remotely controlled valve such as a Cla-Val No. 81 PM-1 made by Cla-Val Co. of Newport Beach, Calif., has a flow control valve passage 24 which, when open, allows flow of fluid from the operating chamber 20 of the magazine sprinkler valve through a drain line 26 to an output drain line 28 connected to a suitable sump (not shown). Check valve 22 is controlled by a valve controller 30, having an operating power chamber 32 which, when pressurized with liquid under pressure, will open the valve passage 24 to allow flow from drain line 26 to output line 28.

A manual control valve embodying principles of the present invention is schematically illustrated at 36 in the system of FIG. 1 and is arranged to supply water under pressure from a supply line 38 to either an output line 40 connected to the operating power chamber of the magazine sprinkler valve or, in the alternative, to an output line 42, which is connected to the operating power chamber of the check valve 22. The manual control is provided for emergency use in case the automatic (heat sensor operated) controls should fail. It is also used, more frequently, for testing the sprinkler valve. It will be readily understood that the connection of lines 40 and 42 to the valves 10 and 22 is shown in only a simplified form in FIG. 1. Connection of an actual system may be made, if desired, via the intermediary of one or more additional remote controlled valves, check valves and the like. In any event, for purposes of the present invention, it is necessary only that the valve 36 provide a selected and controllable one of three conditions.

In the first of these conditions, namely a magazine sprinkler valve open condition, water under pressure is applied from high pressure source 38 through the valve 36, and via line 40 to the magazine sprinkler valve operating chamber 20, to open this valve. In this condition manual valve 36 blocks flow of water from supply 38 to its second output line 42, and thus the check valve 22 remains closed.

In a second condition of manual valve 36, flow of water from the input 38 to output 40 is blocked by the valve, but flow from input 38 to output line 42 is enabled so as to pressurize operating chamber 32 of the check valve and open the check valve, thereby allowing the operating chamber 20 of the magazine sprinkler valve to drain. This may be termed the closed position of the manual valve 36, where "closed" refers to the sprinkler valve.

The manual valve also has a neutral condition in which flow of water from input line 38 to both of output lines 40 and 42 is blocked. In this neutral position the magazine sprinkler valve is in condition to be operated by some other remote valve (not shown) or a remotely positioned heat sensor (not shown). Neither of these alternate valves for alternatively operating the magazine sprinkler valve forms a part of the present invention. It will be understood, of course, that although but a single manual control valve 36 is illustrated for auxiliary control of the magazine sprinkler valve 10, one or more additional manual control valves identical to valve 36 may be provided at different positions and appropriately connected so that the magazine sprinkler valve may be manually controlled from more than one location.

Figure 3:
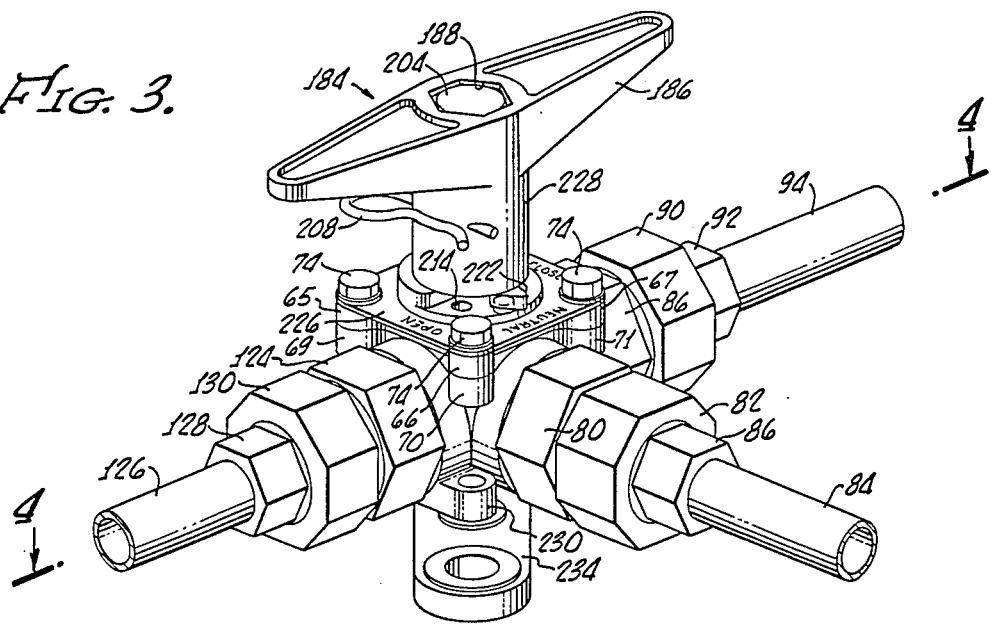
FIG. 3 is a perspective view of the exterior of the valve.

Referring to FIGS. 2 and 3, a manual control valve embodying principles of the present invention comprises a small, light-weight and compact valve body 50, having an inner valve chamber 52, first and second output ports 54, 56, and an input port 58. Each of the ports 54, 56 and 58 is internally threaded. Valve chamber 52 is in communication with each of the ports and with a cover opening 60, which is closed and sealed by a valve cover 62. Valve cover 62 includes a cover plate 64, having outwardly extending ears 65, 66, 67 and a fourth ear (not shown in FIG. 2) which cooperate with corresponding valve body ears 69, 70, 71 and 72 on upper portions of the valve body. The valve body ears are threaded so that bolts, such as a bolt 74, may be inserted through the apertures of the cover plate ears into threaded engagement with the valve body ears, thereby to hold the cover plate securely upon and sealed to the valve body. The cover plate includes a depending cylindrical cover body 76, which is received within the right circular cylindrical aperture 60 of the valve body. A pin 78 fixed to the cylindrical body 76 extends into the valve chamber for ensuring proper orientation (preventing incorrect assembly) of a circular cam, to be described hereinafter.

An input port housing 80 (FIGS. 3 and 4) has a decreased diameter externally threaded end that is threadedly received in the threaded input port 58, and is connected via a fitting cap nut to an input line 84 that is sealed and secured to an end fitting 86 that is captured by the cap nut 82. The first and second input ports 54 and 56 are provided with identical valving arrangements which, for input port 54, includes a second port housing or tubular valve seat housing 86 (not shown in FIG. 2, but shown in FIGS. 4 and 5), having a decreased diameter inner end that is threadedly received in and sealed to the internally threaded input port 54. Seat housing 86 includes an externally threaded outer end 88 that threadedly receives a fitting cap nut 90, securing an output fitting 92, to which is sealed and secured an output line 94. As best seen in FIG. 5, the outer end 88 of seat housing 86 includes an output aperture 96 that leads to an enlarged seat shoulder 98, upon which is mounted a valve seat 100. Seat 100 is a soft, apertured rubber or elastomeric disc, having a rigid plastic insert 102 secured in the disc aperture. A valve poppet 104 (best shown in FIG. 7) includes a poppet head 106, having a diameter that is a close but sliding fit within the bore of seat housing 86, and has sides of its head ground off to provide two mutually opposed flat surfaces 108 that permit flow of water past the poppet head. The outermost end of the poppet head is formed with a relatively sharp annular closure ridge 109, forming a sort of circular knife edge that protrudes longitudinally forwardly from a recess 110 formed in the outer end of the poppet to enable the sealing ridge 109 of the poppet to clear the plastic insert on the seat. The inner end of the poppet includes an integral shank 112, which has an elongated transverse recess 114 opening through the inner end of the poppet, which is formed with a circularly curved recess 116 that is transverse to the recesses 114. A cam pin aperture 118 extends through the inner end of the poppet and through the longitudinally extending recess 114 to enable driving of the poppet by a cam to be described below. The poppet shank has a diameter less than the diameter of the seat housing, less than the diameter of the valve body output ports and less than the diameter of the neck 120 (FIG. 4) of the valve body chamber that communicates with the output port. This allows water to flow from the valve chamber longitudinally past the poppet.

As previously mentioned, there is a second poppet 122, identical to the poppet 104, mounted in a third port housing (e.g. a second seat housing) 124, which is identical to the seat housing 86. Housing 124 is connected to a second output line 126 by means of a fitting 128 captured by a nut 130 that is threadedly engaged with the externally threaded outer end of poppet 122. A second valve seat 132 is seated in the outer end of the seat housing 124 and has a rigid plastic insert 136. Valve seat 132 receives the circular ridge sealing end of the poppet 122 to effect a tight seal and closure of the opening through the valve seat housing 124 when the poppet is driven toward the left, as viewed in FIG. 5.

Figure 4:
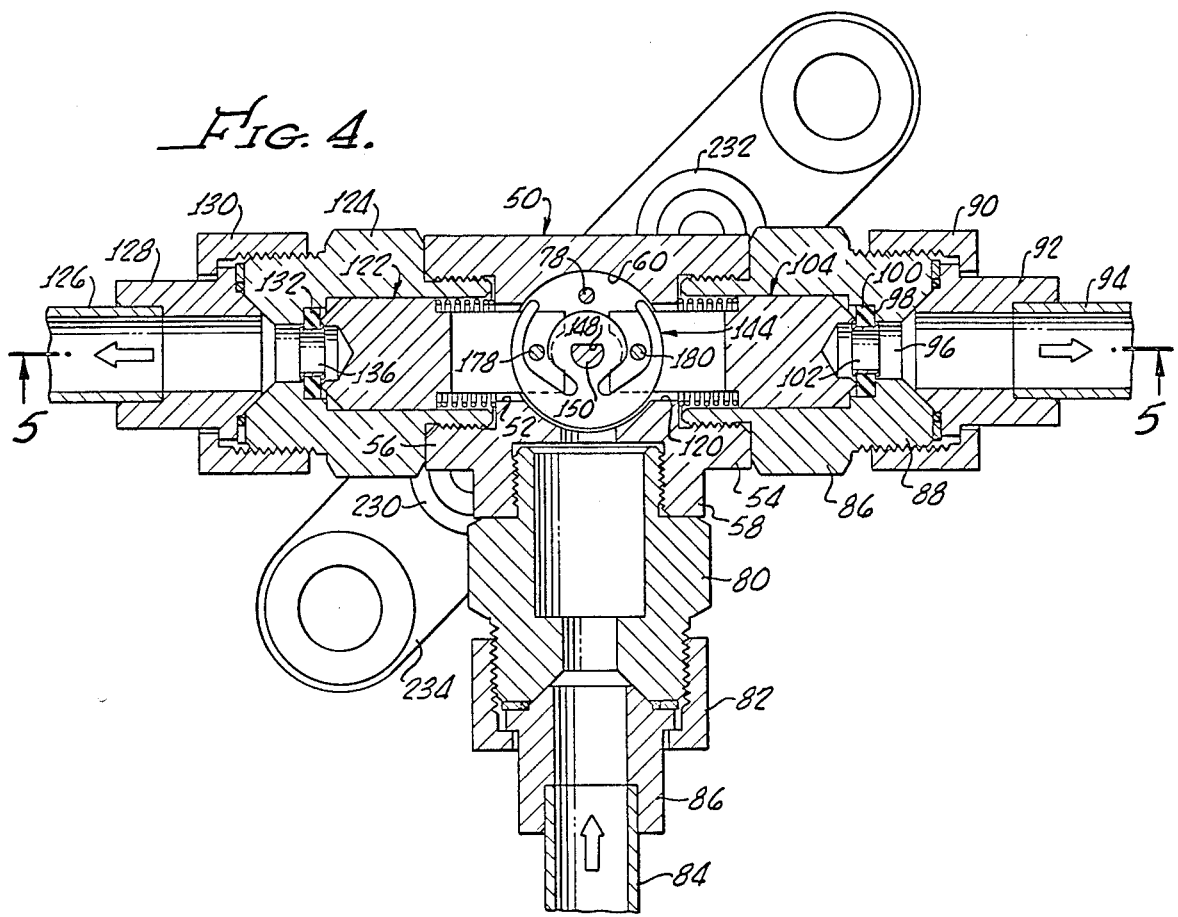
FIG. 4 is a section taken on lines 4—4 of FIG. 3.
Figure 5:
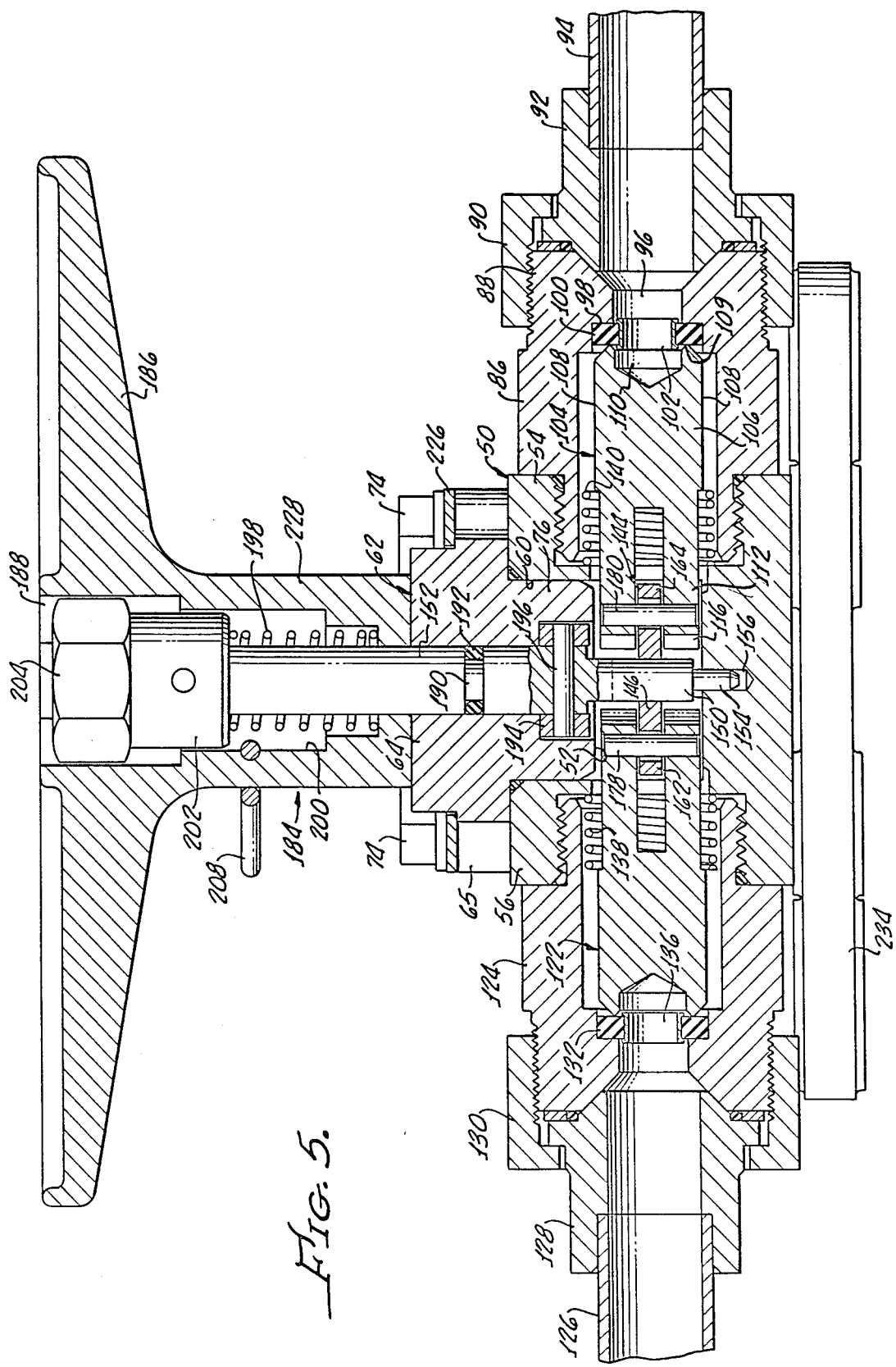
FIG. 5 is a section taken on lines 5—5 of FIG. 4.

First and second springs 138,140 surround the decreased diameter shanks of poppets 122 and 104, being compressed between the valve body at the output ports and the shoulders formed by the enlarged popped heads, as can be best seen in FIG. 4.

A generally circular flat cam plate 144 (FIGS. 8, 9 and 10) has a central hub portion 146 formed with a non-circular aperture 148 for reception of a correspondingly shaped non-circular drive shaft 150 formed on the end of a handle stem 152 (FIG. 5). A decreased diameter journal pin 154 is fixed to the end of the non-circular drive section 150 and extends longitudinally outwardly therefrom into an aperture 156 (see FIG. 5) formed in the bottom of the valve body, thereby helping to position and journal this end of the rotary handle stem.

Cam plate 144 is formed with a pair of slots 158,160 which are defined in part by circular cam arms 162,164, which have forward portions that are concentric with and spaced from a circular forward portion of the central or hub section 146 of the cam. The two arms 162 and 164 do not extend completely around the central portion of the front of the cam hub, but terminate at positions that are mutually spaced from one another to facilitate assembly of the cam. When assembled, the locating pin 78 (FIG. 2) extends close to the front portion of the cam hub between the adjacent ends of arms 162 and 164, and thereby prevents the cam from being installed improperly.

Slots 158,160 have substantially straight camming rear sections 170,172, having straight cam surfaces 174,176 that cooperate with cam pins 178,180. Pins 178,180 extend through the apertures 118 of the shank portions of the poppets and are fixed to the poppets. The cam plate is received in the poppet recesses 114, as can be best seen in FIGS. 4 and 5, and is mounted for rotation within the right circular cylindrical chamber of the valve body.

The valve includes a handle assembly 184, having a T-shaped handle 186 formed with an upwardly opening non-circular recess 188. Handle stem 152 extends through a central aperture in cover 64 and includes a reduced diameter or circumferential recessed portion 190 (FIG. 5), carrying a sealing o-ring 192 to seal the rotary valve stem to the cover. The cover body 76 includes an enlarged lower end recess which receives a collar 194 (FIG. 5) that is fixed to the handle stem 152 by a pin 196 after the handle stem is inserted through the cover.

A spring 198 is compressed between the lower end of the bore 200 within the interior of handle 184 and the shoulder on the lower surface of an enlarged head 202 of the handle stem 152. The handle stem 152 has fixed to its upper end an hexagonal nut 204, which is congruent with the hexagonal opening 188 of the handle 184, thereby effecting a rotational driving relation between handle 184 and stem 152.

Handle 184 is longitudinally slidable upwardly with respect to handle stem 152 and is urged downwardly by means of compression spring 198. A detachable safety pin 208 extends through a hole in handle 184 and is positioned to block upward slidable motion of handle 184 until the safety pin 208 is removed.

Cover plate 62 has an integral disc 210 (FIG. 2) fixed to its upper surface and carrying an integral semicircular thickened disc portion 212, which is apertured for reception of the handle stem 152. Cover plate disc 210 has a plurality of circumferential spaced circular recesses 214,216,218 (as best seen in FIG. 6) which cooperate with a locating pin 220 carried by the handle 184. A pointer 222 is fixedly positioned adjacent locating pin 220. Pin 220 is received in a selected one of apertures 214,216 and 218 by removing the safety pin 208, raising handle 184 relative to stem 152, and rotating the handle, and thereby the stem, until the locating pin 220 may be positioned in a selected one of the rotational position indicating apertures 214,216, 218. A top plate 226, apertured to receive the cylindrical lower portion 228 of handle 184, is secured to the cover plate by means of bolts, such as bolts 74 that secure the cover plate to the valve body. Top plate 226 bears indicia, such as "open", "neutral", and "close" adjacent respective ones of the apertures 214,216, and 218 so that the handle rotational position indicator 222 will visually indicate the sprinkler valve position when pin 220 is in one of the positions defining apertures 214,216,218.

A pair of apertured valve body lugs, such as lugs 230 and 232 (FIG. 4), are formed integrally with and positioned at diagonally opposite corners of the bottom of the valve body for attaching the valve to a valve base 234, which itself can be secured to any desired valve support.

In assembly of the valve, the handle and cover are assembled initially, with the handle stem being inserted through the handle and then inserted through the central aperture of cover plate 64. Collar 194 is then pinned to the handle stem to hold the handle sub-assembly together. The cam plate then is inserted into the central aperture 60 forming the chamber of the valve body, with the open part of the cam slots facing away from the input port 58. The cam plate can be inadvertently assembled with the open part of the slots facing toward the input port 58, which would prevent proper operation of the valve. However, the cam orientation pin 78 fixed to the cover plate extends past the cam plate through the opening between the free ends of the cam plate arms. If a cam plate is oriented improperly with respect to the cover plate, the cover and handle assembly cannot be assembled to the body.

With the cover and handle assembly bolted in place, by means of bolts 74, one of the poppets with its spring is then inserted into one of the output ports, being rotationally oriented to ensure that its recess 114 receives the cam plate. The handle is turned to open or closed position (e.g. the position of FIG. 9 or 10) to allow the cam pin 178 or 180 to enter the cam slot. The seat housing is then inserted over the poppet and threaded into place. The same steps are provided to assemble the second poppet and second seat housing, but the cam plate must be turned to the opposite position for assembly of the second poppet and seat housing. Thus, to assemble poppet 104, the cam plate must be in the open position illustrated in FIG. 9, whereas to assemble poppet 122, the cam plate must be in the closed position illustrated in FIG. 10.

FIGS. 8, 9 and 10 illustrate the three positions, "Neutral", "Open" and "Closed" of the disclosed valve. In the "Neutral" position of rotation of the handle, locating pin 220 of handle stem 184 is received in recess 216 of the cover plate. Thus the cam plate is positioned as illustrated in FIG. 8, wherein neither of the cam arms 162,164 contacts cam pins 178,180, which are positioned radially inwardly (by a slight distance) of the concave cam surfaces of the cam slots. In other words, the cam plate, in this position, is not operable upon the cam pins. Therefore, cooperative action of the poppet closing springs 138,140, together with the pressure of the water supplied through input port 58, drives the poppets outwardly to ensure seating of the circular sealing ridges at the poppet ends upon the valve seats. In this "Neutral" position of the valve, then, both of its output ports are closed and no flow through the valve occurs.

If it is desired to use the valve to open the magazine sprinkler valve, the handle is lifted, after removing the safety pin 208, to withdraw locating pin 220 from aperture 216, and the handle is rotated toward clockwise (as viewed in FIGS. 8, 9 and 10) to allow pin 220 to fall into recess 214 so that pointer 222 on the handle will indicate "Open" position. This clockwise rotation of the handle and cam plate from the position of FIG. 8 to the position of FIG. 9 has no effect upon the pin 180, since the forward portion of the slot in which this pin is received is circular and concentric with the cam plate center. However, the inner portion of each cam slot extends along a chord of a circle centered on the center of the cam plate, and thus inclines more closely toward the center of rotation toward the rear of the cam plate. Accordingly, as the cam plate is turned in a clockwise direction, the straight cam surface 174 on the outer side of the cam slot 158 contacts the cam pin 178 and pulls it axially of the poppet and toward the cam center. Thus the poppet is pulled from its seat to enable flow of water from the input port, through the valve body chamber, past the poppet and through the aperture of the valve seat to output pipe 126. As previously mentioned, if this valve is employed in a munitions magazine control sprinkler valve control system, the water from pipe 126 of the valve in its open position will pressurize the operating chamber of the magazine sprinkler valve and cause the latter to open.

To employ the described valve to close the magazine sprinkler valve, the handle is rotated in a counter clockwise direction to the "Closed" position, in which pin 220 is received in recess 218 of the cover plate. In the course of this counter clockwise rotation, cam pin 178 of poppet 122 is effectively released by the cam, being received in the relatively wider forward slot portion of cam slot 158, where the pin is no longer pulled or axially displaced from its poppet closed position by the cam. Further, in the course of the counter clockwise rotation, cam pin 180 of the poppet 104 enters the cam slot 160 and is contacted by the straight, radially inwardly slanting cam surface 176 of this cam slot, thereby forcing the cam pin 180 and the poppet to which it is attached axially away from its seat to the position illustrated in FIG. 10. In this position of the valve, water under pressure flows from the valve input through the output port 54 to output pipe 94. If this manual control valve is employed in the described magazine sprinkler valve control, water pressure from pipe 94 will allow the magazine sprinkler valve to close by providing pressure to the operating chamber of the check valve, which opens to drain the magazine sprinkler valve operating chamber.

As previously mentioned, in "Neutral" position, both poppets are seated on the valve seats, being driven outwardly by spring action and water pressure, both cam pins are free of the cam plate, and no water flows through the control valve.

The described valve has a number of unique and highly desirable features. The poppet and valve seat arrangement provides a positive, tight shut-off, with the poppets driven to closed position by a combination of spring force and water pressure, which is always present within the valve chamber. The springs help the poppets to close when input pressure is small. The valve provides resilient seats for the two output ports to help ensure a tighter shut-off and a longer leak free life. The valve is easy to repair, particularly by reason of the configuration of its poppet and valve seat arrangement. To change the valve seat or poppet it is only necessary to unscrew the seat housing from the valve body, and thus the entire valve does not have to be disassembled. The valve is of light weight, employing a small, compact valve body that requires a minimum of space and material.

MODIFIED CONFIGURATION

Figure 11:
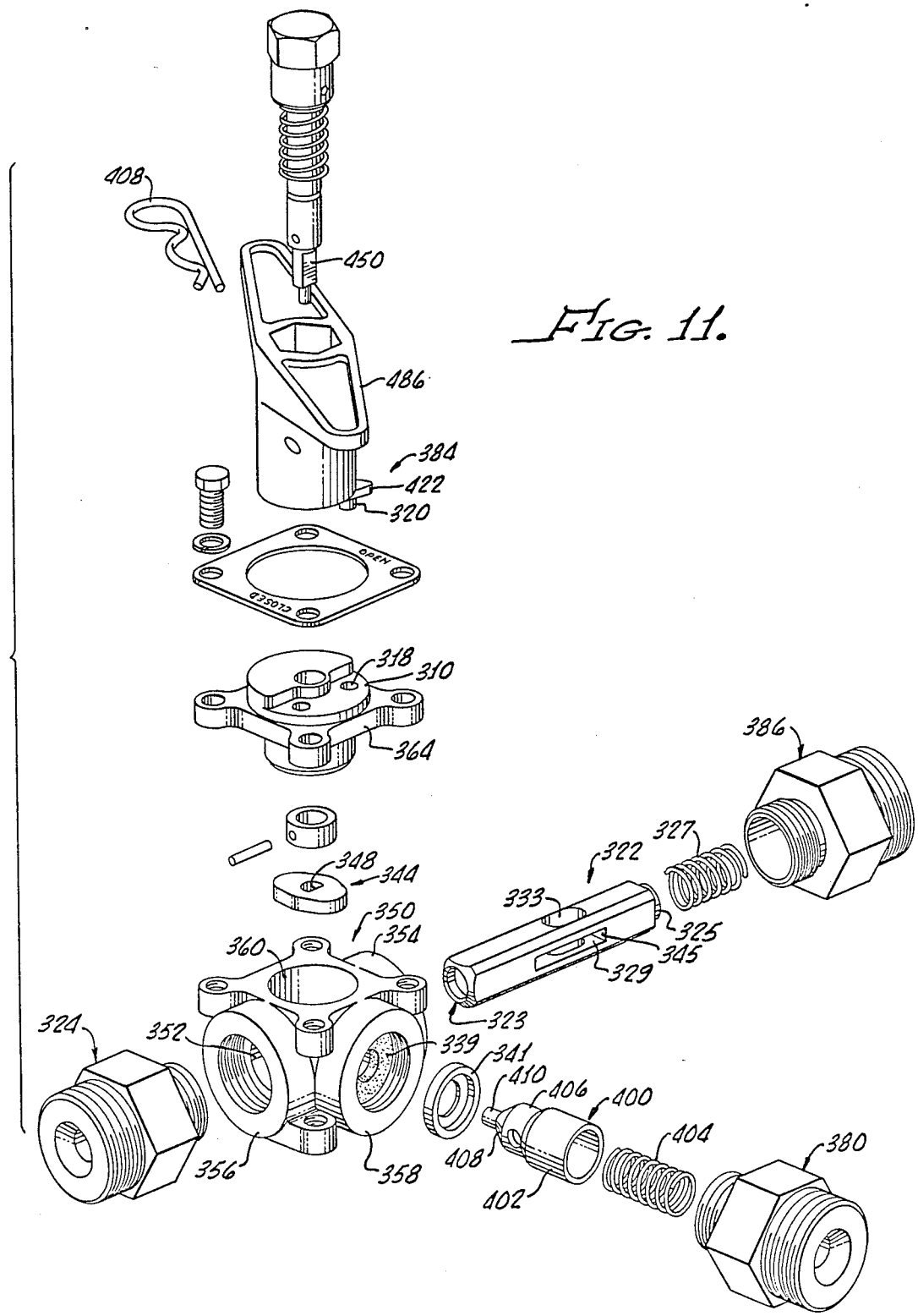
FIG. 11 is an exploded pictorial view of a modified valve.

The simple, compact design of valve body, valve seat and port housings and handle mechanism, make the described valve construction readily adaptable for valves of other functions. Modification of the described valve for use as a three way valve in a different magazine sprinkler valve control system is illustrated in FIGS. 11, 12 and 13. In the different magazine sprinkler control system with which the valve of FIGS. 11 through 13 is to be used as a manual control valve, the latter has but two positions - open and closed. In the open position of the manual valve of FIGS. 11 through 13 (e.g. the sprinkler valve is open), water under pressure is supplied through the manual control valve to the operating power chamber of the magazine sprinkler valve. In the closed position of the manual valve (e.g. the magazine sprinkler valve is closed), the operating power chamber of the sprinkler valve is allowed to drain through the manual valve, but no pressurized water is applied. This manual control valve has no third position.

In describing the valve of FIGS. 11 through 13, like parts will be identified by corresponding reference numerals preceded by a "3" or a "4". Thus, the series of references numerals for FIGS. 11 through 13 are in the 300's or 400's. The valve body 350 of FIGS. 11 through 13 is identical with the valve body 50 of the earlier embodiment and includes three input ports 354, 356 and 358, and a valve chamber 352 communicating with a cover opening 360. Also, the entire handle mechanism, handle assembly 384, is identical with the handle assembly 184 of the earlier described valve, except for certain minor changes to be described below. Because the valve of FIGS. 11 through 13 has but two positions, disc 310, integral with the cover plate 364, has only two locating recesses 318 for reception of locating pin 320 adjacent the position indicating pointer 422 of the handle assembly. Also, a slightly different cam is operated by the same flat sided handle stem shaft 450.

Threadedly engaged in and sealed to the internally threaded openings of the valve ports 354,356,358 are three port housings 380,386 and 324. Port housing 324 is identical to housing 124 of the first embodiment, and the two other port housings 380 and 386 are substantially the same but have valve seating arrangements slightly modified (housing 380) or have no valve seat, as is the case with housing 386. Poppet 322 has a valve closure end 323 that is identical to the closure end of poppet 104, illustrated in FIG. 7, although the cross section of the poppet 322 is generally square with chamfered corner edges between its four flat sided surfaces. The other end of poppet 322 is formed with a necked-down stub shaft 325, which helps to seat a spring 327, interposed between the poppet and port housing 386 and tending to urge the poppet to a poppet closed position. The elongated poppet 322 extends completely through the valve body chamber, through aligned ports 356,354 and is axially slidable in the valve body. In closed position of poppet 322, illustrated in FIG. 13, the circular knife edge at the closure end of the poppet seats upon the elastomeric disc 332, captured in the outer end of port housing 324, and held in place by a rigid plastic insert 302. Poppet 322 is formed with an elongated slot 329 (FIG. 11) that extends entirely through the poppet and receives a cam plate 344 that is shaped considerably differently than the cam 44 of the earlier embodiment. This cam, however, like the earlier cam, has a flat sided driving aperture 348 for reception of the flat sided shaft 450 of the handle stem.

Extending transversely through poppet 322, in a transverse direction perpendicular to the extent of slot 329, is an aperture 333 that is elongated along the length of the poppet for reception of the stem of the handle. The aperture is elongated to allow the poppet to slide longitudinally relative to the handle stem.

At port 358, which is used as a supply port in this arrangement, an elastomeric valve seat 339 is seated in the port 358 and held in place by a rigid retainer 341. This retainer, like the retainers for the other elastomeric valve seats described herein, helps to prevent the flexible seat from flowing and becoming dislodged under very high pressures. A supply poppet 400 has a hollow cylindrically shaped outer end 402, receiving one end of a compression spring 404, which has the other end abutted against a shoulder formed in an outer end of supply port housing 380. Poppet 400 includes an integral decreased diameter inner section 406, which is apertured to permit flow of water through the poppet, and an inner conically tapered closure end 408 that terminates in an inwardly extending cam follower 410 that projects into the valve chamber when the poppet is seated, as in FIG. 12.

Cam plate 344 is relatively elongated in the longitudinal direction of the poppet 322 (when the latter is in the sprinkler valve closed position illustrated in FIG. 12), and at one end has a curved cam lobe 412.

In the closed position of the manual valve (magazine sprinkler valve closed), as illustrated in FIG. 12, water from the operating power chamber of the sprinkler valve is allowed to drain into the valve body via housing 386 and flows through the valve body, through the open port 352 and housing 324 to a drain sump (not shown). In this closed position, poppet 400 has its conical seating surface 408 driven into sealing engagement with the inner peripheral edge of elastomeric valve seat 339 by a combination of the action of spring 404 and the high pressure of water applied to the input of supply housing 380. In this valve, as in the previously described embodiment, the several springs urge the poppets to their closed position to assist them in sealing at very low pressure. The high pressure supply flow, in this valve position, is blocked by closed supply poppet 400, and the sprinkler valve operating chamber can drain, to allow the valve to remain closed.

To open the sprinkler valve, the valve handle 486 of handle assembly 384 is lifted (after the safety pin 408 is removed), and rotated in a clockwise direction (from the closed position of FIG. 12) to cause lobe 412 of the cam plate 344 to release poppet 322 and to engage the cam follower 410 on the inner end of supply poppet 400. In moving to open position (FIG. 13) the cam lobe pushes the supply poppet off of its seat 339, opening the supply port via supply housing 380. As the cam turns and lobe 412 opens the supply poppet, the poppet 322 is released because the cam lobe moves out of engagement with the side 345 of cam slot 329. This allows the combination of spring 327 and supply water pressure to drive poppet 322 toward the left to cause it to seat upon the valve seat 332, thereby closing port 352, which leads to the drain.

This open position of the control valve is illustrated in FIG. 13. Valve port 354, connected to the magazine sprinkler valve, is always open, and therefore water under high pressure is admitted through the open port at the inner end of supply housing 380, passing the inner end of open supply poppet 400 and flowing through the valve chamber and out through the port housing 386. The cam configuration is such that with the cam in the open position of FIG. 13, poppet 322 is no longer pushed off its seat, and thus may close and seal the valve body port 356 which connects to the drain.

To close the valve of FIGS. 11 through 13, the handle is lifted and turned counter clockwise from the position illustrated in FIG. 13 to that illustrated in FIG. 12, causing the lobe 412 of the cam to release the supply poppet, allowing spring and water pressure to close the supply port, and causing the lobe to engage the side 345 of the elongated slot in poppet 322 and to push this toward the right (as viewed in FIGS. 12 and 13) off of the seat 322, to attain the position illustrated in FIG. 12. The longitudinal elongation of aperture 333 of poppet 322 allows the poppet to reciprocate longitudinally with respect to the relatively fixed handle shaft 450.

Assembly of the valve is substantially similar to assembly of the valve first described and illustrated in FIGS. 1 through 10. However, the insertion of the cam requires some manipulation of the poppet 322. The poppet 322 is inserted into the valve body before housings 324,386 are screwed into place (with the spring 327 interposed between an end of the poppet and housing 386). Before any of the handle assembly has been connected to the valve body, the poppet 322 is turned about its longitudinal axis to cause slot 329 to face upwardly, toward the cover receiving opening 360. One or more of the housings 324,380 and 386 as yet are not assembled to the body to enable this manipulation of the poppet 322. With the poppet slot 329 facing upwardly, the cam plate 344 is inserted downwardly through the opening 360 into the slot 329. Then the poppet is rotated 90 degrees about its longitudinal axis, and the cam and poppet are manipulated, being moved back and forth or slightly rotated as the handle assembly is inserted, to insert the flat sided drive stem 450 into the flat sided drive aperture of the cam. The handle assembly is then bolted to the body, and the several port housings with springs and supply poppet, seals and inserts are attached to the body.

The advantages described above in connection with the valve illustrated in FIGS. 1 through 10 are also provided by the valve of FIGS. 11 through 13. Moreover, it will readily be seen that the same basic structure and configuration of small, compact valve body, handle arrangement and the three port housings enable the valve to be readily modified by changing relatively few of its parts to enable the valve to perform a number of different functions.

Proper, tight closing and sealing of the poppets does not depend on operation of the cam and is not adversely affected by lack of precision or wear of the parts, because the poppet closing action is independent of the cam, and is achieved only by combination of spring force and input water pressure.

The resilient valve seat is subjected to very high water pressure during flow through the seat aperture. Many elastomeric materials tend to flow under such high pressure, and the seat may become dislodged from its seat housing. However, the use of the rigid plastic inserts 102, 136 around the aperture of the seat disc prevents such seat distortion and dislodging.

The poppet and valve seat arrangements provide for flow with a lesser pressure drop because they enable use of a relatively large area opening through the seat.

Not only are the valves small, compact and easily manufactured, but many parts are made of lightweight materials for greatly decreased weight. For example, poppets may be made of delrin plastic, the handle of aluminum, the cam and valve seat housings of monel metal, with only the cover and body made of bronze. Thus the valve is strong, compact, lightweight, and will withstand corrosive environments such as sea water.

The foregoing detailed description is to be clearly understood as given by way of illustration and example only, the spirit and scope of this invention being limited solely by the appended claims.

What is claimed is:

1. A control valve comprising:
   a valve body having a valve chamber and first, second and third ports,
   first and second port housing means for providing first and second valve seats at said first and second ports respectively,
   first and second poppets slidably mounted to the valve body for motion between a closed position in which the poppet contacts a valve seat to block flow through the associated port, and an open position in which the poppet is displaced from the valve seat to permit flow through the associated port, said poppets having a common longitudinal axis and first and second cam slots, respectively,
   first and second springs on respective ones of said poppets for driving the poppets to closed position,
   manually operable cam means for selectively driving one or the other of said poppets to said open position, said cam means comprising a cam having substantially equal portions thereof within said first and second cam slots when both said poppets are in said closed position, and having a major portion within the slot of a selected one of said poppets when said selected one of said poppets is in said open position, and
   a third port housing connected with said third port for admitting a fluid to said chamber.

2. The control valve of claim 1 wherein said manually operable cam means comprises a cam in said valve body and including a hub section having a convex circular forward cam surface and a pair of circular arms fixed to a rear part of said hub section and extending about said hub section in spaced relation thereto, said arm having concave circular forward surfaces and non-circular rearward cam surfaces cooperating with said hub section to define first and second forwardly opening cam slots, said slots extending in a circular path adjacent portions of said forward cam surface and being radially spaced from the center of said hub section by a first distance, said slots having rearward portions extending inwardly and rearwardly adjacent said rear part of said hub section and being spaced from the center of said hub section by a distance not greater than said first distance and that progressively decreases toward the rear of said slots, first and second drive pins connected to respective ones of said first and second poppets and received in said first and second cam slots, whereby one or the other of said poppets is pulled toward said hub and to open position as said cam is rotated in one direction or the other.

3. The control valve of claim 2 including a handle connected to the cam, and latch means for holding said handle and cam in a selected one of three cam positions, both said first and second ports being closed in a first one of said cam positions, said first and second ports being respectively open and closed in a second one of said cam positions, and said first and second ports being respectively closed ond open in a third one of said cam positions.

4. The control valve of claim 2 wherein at least one of said poppets includes a head adapted to seat upon and seal one of said valve seats and a shank having a longitudinal open ended slot receiving a portion of said cam, one of said drive pins extending transversely through said shank, across said open ended slot and through one of said cam slots.

5. The control valve of claim 1 wherein said cam slots comprise a pair of mutually oppositely disposed bent cam slots, said cam being positioned between said poppets and centered on said axis, first and second cam follower pins secured to said first and second poppets respectively, said pins being respectively received in said first and second cam slots, and means for rotating said cam plate.

6. The control valve of claim 1 wherein said first port housing means comprise a first seat housing having a bore extending there through and having an inner end threadedly engaged with said valve body at said first port, said seat housing including an outer port having said first valve seat secured thereto, said first poppet being slidably received within the bore of said seat housing and having a sealing end in sealing engagement to said first valve seat when said first poppet is in said closed position, said cam being connected with an inner end of said poppet for slidably driving said first poppet in said seat housing.

7. The control valve of claim 6 wherein each said valve seat comprises an apertured elastomeric disc, and a rigid insert secured to and lining the aperture of said disc.

8. The control valve of claim 1 wherein said first port housing means comprises a tubular seat housing aligned with said first port and detachably secured thereto, said seat housing extending outwardly of said valve body from said first port and having an outer end, said first valve seat being mounted in said seat housing at said outer end, said first poppet being slidably received in the bore of said seat housing and having inner and outer ends, said first poppet outer end engaging said seat when poppet is in said closed position, said first poppet inner end extending through said first port into said valve body, said means for selectively driving comprising a valve handle rotatably mounted to said valve body, and said cam including cam slot and pin means for sliding said first poppet in said seat housing in response to rotation of said handle.

9. The control valve of claim 9 wherein said pin means comprises a cam follower pin secured to said first poppet and received in said first cam slot, said handle being connected to said cam for effecting rotation of said cam and thereby effecting axial, slidable motion of said first poppet within said seat housing bore to said open position.

10. A control valve comprising:
a valve body having first, second and third ports,
a first tubular seat housing having an axial bore and being detachably connected to said valve body at said first port, said first seat housing extending radially outwardly of said body and having a first valve seat therein,
a first poppet slidably mounted within said first seat housing, having an outer end adjacent said valve seat and having an inner end extending through said first port into said valve body, said first poppet having a first cam pin secured to said inner end and having a first cam receiving slot,
a second tubular seat housing having an axial bore and being detachably connected to said valve body at said second port, said second seat housing extending radially outwardly of said body and having a second valve seat therein,
a second poppet slidably mounted said second seat housing having an outer end adjacent said second valve seat and having an inner end entending through said second port into said valve body, said second poppet having a second cam pin secured to said inner end thereof and having a second cam receiving slot,
spring means on said poppets for urging the poppets to a closed position in which said poppet outer ends contact said first and second valve seats respectively,
a valve body cover secured to and sealing said valve body,
a handle extending through said cover into said vlave body, said handle being journaled in said cover,
a cam plate in said valve body between said first and second ports, said cam plate being received in both siad cam receiving slots,
means for connecting said handle to said cam plate for rotation of said cam plate together with said handle,
said cam plate having first and second slots receiving said first and second cam pins respectively,
said cam plate being rotatable to first, second and third rotational positions and being configured (a) to shift one of said cam follower pin and said first poppet in a first direction when a major portion of said cam plate is disposed in said first cam receiving slot and said cam plate is in said first rotational position to thereby open said first port without opening said second port, and (b) to shift the other of said cam follower pins and said second poppet in a direction opposite said first direction, to thereby open said second port and without opening said first port when said cam plate is in said second rotational position and has a major portion disposed in said second cam receiving slot, and (c) to permit both said cam follower pins to shift outwardly of said valve body and allow both said first and second poppets to be shifted toward said first second valve seats respectively by said spring means and pressure within said valve body, thereby to close both said first and second ports, when said cam plate is disposed equally within said cam receiving slots and is in said third rotational position, and
fitting means connected to the third port for supplying liquid under pressure to said valve body.

11. The control valve of claim 10 wherein each said valve seat comprises an apertured elastomeric disc, and a rigid insert secured to and lining the aperture of said disc.

12. The control valve of claim 10 wherein said valve chamber is in communication with all of said ports, the inner end of each of said first and second poppets having a diameter less than the diameter of said first and second ports to permit flow from said chamber past said inner ends, said cam plate and cam pins being positioned within said valve body chamber.

13. The control valve of claim 10 wherein the inner end of each said poppet has a poppet recess, outer portions of said cam plate and respective ones of said cam slots being received in respective ones of said poppet recesses.

14. A manually operable control valve comprising:
a valve body having a valve chamber,
first and second mutually aligned ports in said body on opposite sides of and in communication with said chamber,
a third port in said body in communication with said chamber,
a cover opening in said body,
a cover fixed to said body and sealing said cover opening, said cover having a handle aperture,
a cam rotatably mounted in said chamber and having first and second oppositely disposed cam slots,
a handle mounted to the cover and having a shaft extending through and journaled in said handle aperture and connected in rotational driving relation to said cam,
first and second seat housings, each having an inner end connected to a respective one of said first and second ports, and each having an outer end positioned outwardly of a respective one of said first and second ports, each said seat housing outer end having a valve seat,
first and second poppets sildably mounted in respective ones of said seat housings, each poppets having an outer end adjacent one of said valve seats and having a slotted inner end in said valve chamber receiving a portion of said cam and one of said cam slots,
spring means for urging said poppets toward said valve seats,
first and second cam pins carried carried by said slotted inner ends of the poppets and extending through respective ones of said cam slots,
first and second output fittings connected to the outer ends of respective ones of said seat housings, and
input fitting means connected to said third port for supplying pressurized liquid to said valve chamber, said handle and cam being rotatable to three mutually distinct cam positions,
said poppets being movable between port open and closed positions in which said first and second ports are open and closed, respectively, said cam being configured to have a major portion in the slotted inner end of the first poppet to hold said first poppet in port open position in a first one of said cam positions, (b) to have a major portion in the slotted inner end of the second poppet to hold said second poppet in port open position in a second one of said cam positions, and (c) to have substantially equal portions in each of said slotted inner ends to allow both said first and second poppets to be driven by said spring means to closed port position in a third one of said cam positions.

15. The control valve of claim 14 wherein each said valve seat comprises an apertured elastomeric disc, and a rigid insert secured to an lining the aperture of said disc.

16. A control valve comprising:
- a valve body having a valve chamber and first, second and third ports opening into said chamber, said first and second ports extending at an angle to one another
- first, second and third port housings having inner ends thereof connected and sealed to said body at respective ones of said ports,
- first poppet means slidably mounted in said first port housing and extending through said first port into said chamber, said first poppet means having a cam slot,
- second poppet means slidably mounted in said second port housing and extending through said second port into said chamber,
- a cam rotatably mounted in said chamber for motion to a plurality of operating postions and having a major portion thereof disposed within said cam slot in all said operating positions,
- first valve seat means for cooperating with said first poppet means to selectively open or close said first port,
- second valve seat means for cooperating with said second poppet means to selectively open or close said second port,
- said cam being configured to contact said first and second poppet means and drive each said poppet means from its respective valve seat means upon rotation of the cam, said cam having a relatively lesser area extending out of said cam slot when said first poppet is open and having a relatively greater area extending out of said cam slot when said second poppet is open, and
- valve operating means secured to said valve body for rotating said cam.

17. The control valve of claim 16 including means coupled with one of said ports for supplying liquid under pressure to said valve body, said poppet means being configured to be driven to their respective seat means in response to said supply of liquid under pressure, whereby at least some of said ports may be closed by liquid pressure exerted upon said poppet means, and may be opened by rotation of said cam to drive the poppet means from their respective seat means.

18. The control valve of claim 16 wherein said valve operating means comprises a valve cover plate fixed to said valve body and having a handle stem aperture, a handle stem extending through said stem aperture and rotatable therein, said stem having an end protion extending into said chamber and non-rotatably connected to said cam.

19. The control valve of claim 18 including a handle non-rotatably connected to said stem, and locking means for selectively restraining rotation of said handle.

20. The control of claim 19 wherein said handle is longitudinally slidable upon said stem, and wherein said locking meams comprises selectively engageable pin and aperture means on said handle and cover plate for releasably locking said handle in a first rotational position and for allowing rotation of said handle to a second rotational position.

21. The control valve of claim 16 wherein said cam slot is located at an intermediate portion of said first poppet means and has an internal slot end, said cam having a cam lobe that engages said slot end in a first rotational position of the cam to drive said first poppet means from its seat.

22. The control valve of claim 21 wherein said second poppet valve seat means is mounted in said second port at an inner end of said second port housing, wherein said second poppet means is mounted in said second port housing and includes a cam follower extending through said second port to said chamber for engagement with said cam lobe in a second rotational position of said cam, and including means for supplying liquid under pressure to said chamber through said second port housing, whereby liquid under pressure will drive one or the other of said poppet means to their respective valve seats in said first rotational position and said second rotational cam position respectively, and whereby said cam lobe engages said cam follower of said second poppet means in said seond rotational position to drive said second poppet means from its seat means, said third port being open in both said cam positions to allow liquid to flow from said third port through said first port in said first cam position, and to allow liquid to flow from said second port through said third port in said second cam position.

23. A manually operable control valve comprising:
- a valve body having a valve chamber,
- first, second and third ports in said body in communication with said chamber,
- a cover opening in said body,
- a cover fixed to said body and sealing said cover opening, said cover having a handle aperture,
- a cam rotatably mounted in said chamber and having a cam lobe,
- a handle mounted to the cover and having a stem extending through and journaled in said handle aperture and connected in rotational driving relation to said cam,
- first and second port housings, each having an inner end connected to a respective one of said first and second ports and each having an outer end positioned outwardly of a respective one of said first and second ports, said first port housing outer end having a first valve seat, said second port housing having a second valve seat at said inner end thereof,
- a third port housing connected to said third port,
- a first poppet slidably mounted in said chamber and extending between said first and third port housings and through said first and third ports, said first poppet having one end adjacent said first valve seat and having a slot intermediate the ends thereof extending through a portion of said poppet in said valve chamber, said slot receiving said cam,
- a second poppet slidably mounted in said second port housing and having an inner end at said second port for cooperation with said second valve seat, said second poppet having a cam follower on an inner end thereof extending through said second valve seat,
- spring means for urging said poppets toward said first and second valve seats respectively,
- said cam being rotatable in said cam slot and in said valve chamber between first and second cam positions and having a major portion within said slot in both said first and second cam positions, said cam being configured to have a relatively lesser area extending out of said cam slot and to push said first poppet from said first valve seat in said first cam position and to have a relatively greater area extending out of said cam slot and to push second poppet from said second valve seat in said second cam position, said second port housing including means for connection to a source of pressurized liquid, whereby in said first cam position said first port is opened by camming contact between the cam lobe and an end surface of said cam slot, and said second port is closed by forces exerted by said spring means and pressurized liquid, and in said second cam position said second poppet is pushed off the second valve seat by said cam lobe to admit pressurized liquid to said valve chamber, and said first poppet is driven onto its seat by forces exerted by said spring means and said pressurized liquid.

* * * * *